United States Patent [19]

Lövgren

[11] Patent Number: 4,779,474
[45] Date of Patent: Oct. 25, 1988

[54] POWER UNIT

[76] Inventor: Sten Lövgren, Svanholmsvägen 10, S-182 75 Stocksund, Sweden

[21] Appl. No.: 889,113
[22] PCT Filed: Nov. 19, 1985
[86] PCT No.: PCT/SE85/00469
   § 371 Date: Jul. 23, 1986
   § 102(e) Date: Jul. 23, 1986
[87] PCT Pub. No.: WO86/03181
   PCT Pub. Date: Jun. 5, 1986

[30] Foreign Application Priority Data

Nov. 28, 1984 [SE] Sweden ................................ 8405995

[51] Int. Cl.$^4$ .................... B65G 63/02; B60P 1/64; F16H 25/00
[52] U.S. Cl. .................................... 74/110; 74/89.15
[58] Field of Search ............................ 74/110, 89.15

[56] References Cited

U.S. PATENT DOCUMENTS

| | | | |
|---|---|---|---|
| 421,247 | 2/1890 | Cook | 74/110 |
| 1,088,238 | 2/1914 | Muncy | 74/110 |
| 2,772,573 | 12/1956 | Thomas | 74/110 |
| 3,174,634 | 3/1965 | Peck | 414/541 |
| 3,212,649 | 10/1965 | Johnson et al. | 74/110 |
| 3,396,601 | 8/1968 | Wright | 74/110 |
| 3,521,939 | 7/1970 | Fall et al. | 312/348 |
| 3,528,303 | 9/1970 | Haller | 74/89.15 |
| 3,665,771 | 5/1972 | Blatt | 74/89.15 |
| 3,727,472 | 4/1973 | Maekawa | 74/89.15 |
| 3,751,998 | 8/1973 | Vasilatos | 74/89.15 |
| 3,792,619 | 2/1974 | Cannon et al. | 74/89.15 |
| 3,810,397 | 5/1974 | Green | 74/110 |
| 4,028,949 | 6/1977 | Hagen | 74/110 |
| 4,534,697 | 8/1985 | Poncet | 74/110 |
| 4,553,444 | 11/1985 | Blatt | 74/110 |
| 4,557,657 | 12/1985 | Olson et al. | 74/110 |

FOREIGN PATENT DOCUMENTS 1542045 3/1979 United Kingdom .

Primary Examiner—Leslie A. Braun
Assistant Examiner—Scott Anchell
Attorney, Agent, or Firm—Gifford, Groh, VanOphem, Sheridan, Sprinkle and Dolgorukov

[57] ABSTRACT

A power unit of the type varying its length comprises three members movable in relation to each other. The power unit is used for transferring load from a first load carrier to a second one. In order to make this transfer possible in a satisfying manner, the power unit has to be constructed so that it can be extended to at least two times its length in the contracted state. For this reason it is a necessity that transmissions comprising wheels (13) and a loop (15) laid around these are so arranged, that when the third member (3) is displaced with respect to the first member (1) fixed in the room, at the same time the second member (2) is displaced in the same direction and the same distance with respect to the third member (3). In order to solve this problem in an appropriate manner the invention proposes to design the first member (1) with at least partly the character of a housing for the power unit, with an elongated shape in cross section. The power device (6, 7, 8, 9, 10, 11) for displacement of the members (1, 2, 3) is disposed generally in the central region (22) of this housing. The transmissions are two in number and they are generally symmetrical in a mirror image relation to each other with respect to a plane comprising the longitudinal axis of the power device and being perpendicular to the greater dimension of the cross sectional shape of the housing (S—S plane).

10 Claims, 4 Drawing Sheets

POWER UNIT

FIELD OF THE INVENTION AND PRIOR ART

This invention relates to a power unit of the type having extensible members for transferring articles.

The purpose of a power unit of this kind is to achieve a maximum extension of the power unit which is at least twice as much as the extension of the power unit in the contracted initial position. The power unit can be used in transferring load between two load vehicles, e.g. a lorry and a railway wagon, or between a load vehicle and e.g. a pallet. Since a load carrier for these vehicles often are approximately equally wide and it is desirable to be able to move the load from one load carrier to another load carrier in one step, so that the load is moved as far into the other load room as desired, the power unit must be able to be extended to a length, which is at least two times greater than its length in a contacted state. The expression at least two times refers to a length which exceeds twice the length of the shortest possible distance between the loads rooms. This distance is required because the two load vehicles frequently cannot be placed completely against each other.

A number of power units for the purpose mentioned above are already known. Among these a power unit according to U.S. Pat. No. 3,521,939 can be considered to be the basis of the present invention. This and other known power units have only one transmission and they possess as a result of the location of the transmission, the disadvantage that the force-lever ratio for the member to which the wheels are attached is very unfavorable. For that reason this member has to be made very strong and rigid, with the result that it becomes heavy, unhandy and voluminous as well as rather costly. The power unit tends through this location also to become rather high, seen in the direction of the normal of the load surface, which leads to its becoming ungainly and room demanding and by that also difficult to locate.

SUMMARY OF THE INVENTION

The object of the invention is to provide a power unit of the type wich varies its length, which reduces the above mentioned disadvantageous of the known power units and which provides easy transportation of objects from a first place to a place located at a distance from the first place which is greater than the length of the power unit in the contracted state. The transportation being carried out generally along a horizontal plane, however, the invention is not limited to horizontal planes. This object is obtained according to the invention by providing a first member having at least partly a housing for the power unit, the housing having an elongated cross section, the power device being disposed generally in the central region of the first member, and two transmissions being generally symmetrical in a mirror image relation to each other with respect to a plane comprising the longitudinal axis of the power device and being perpendicular to the greater dimension of the cross-sectional shape of the housing.

BRIEF DESCRIPTION OF THE DRAWINGS

With reference to the appended drawings, below follows a specific description of an embodiment of the invention chosen as an example. In the drawings.

DETAILED DESCRIPTION OF PREFERRED EMBODIMENT

Figure 1:
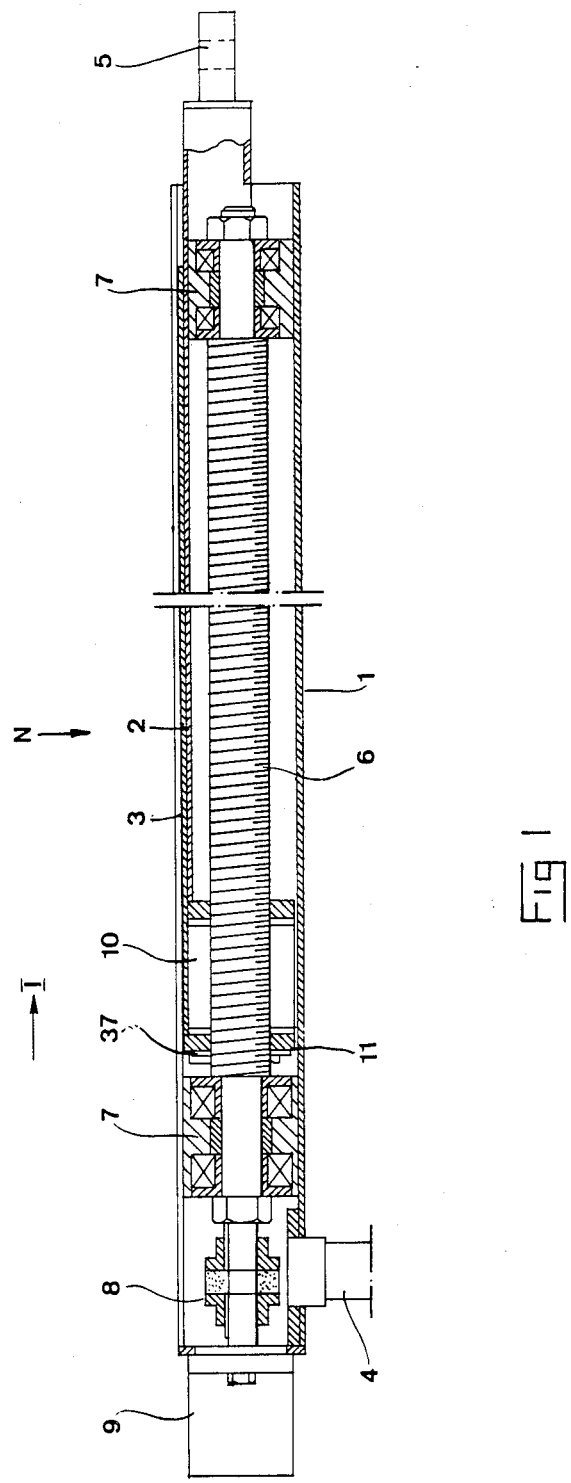
FIG. 1 is a partly simplified view cut in the symmetry plane S—S of the power unit in accordance with the invention, dashed lines are used to indicate removal of a portion of the unit in order to compress the drawing.

In FIG. 1 a first member 1, which generally constitutes an outer housing of the power unit. This member is at its one outer end provided with a first attaching mount 4, by which the power unit can be attached to an object, for example a lorry platform. A second member which is indicated with 2 is encased by the first member and a third member indicated with 3 and has an elongated extension in the direction to the right in the figure. The second member is at its outer end provided with a second attaching mount 5 for attaching of the power unit to preferably a transmitting member of a transferring device. The second and the third member are movable in the direction of the arrow I with respect to the first member and with respect to each other.

Figure 2:
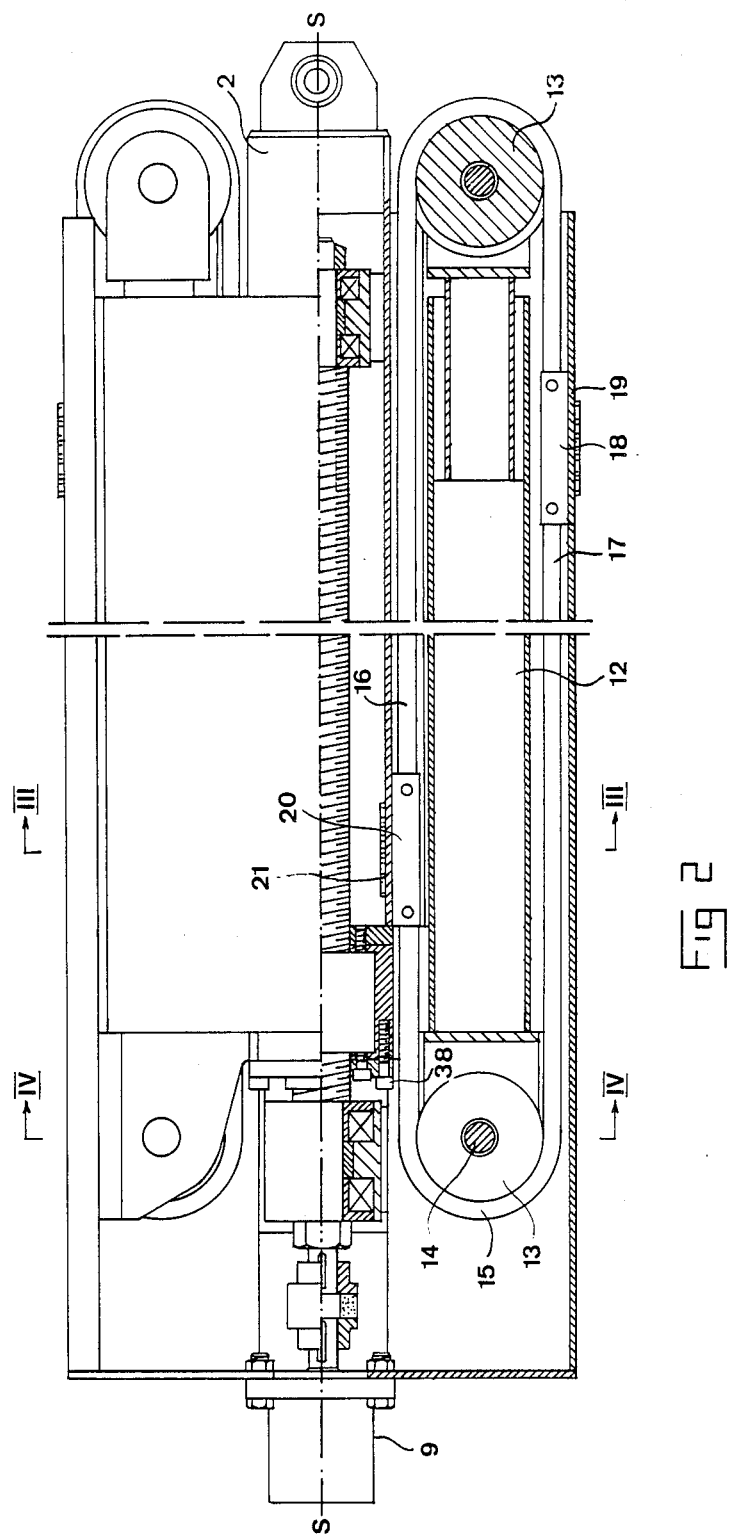
FIG. 2 illustrates the same power unit as is illustrated in FIG. 1 in a partly sectioned view from the N-direction (FIG. 1), dashed lines are used to indicate removal of a portion of the unit in order to compress the drawing.

The power unit has a power device which consists of the components described hereafter. The first member includes a longitudinal screw 6 extending in the direction of the arrow I generally between the two outer ends of the power unit. This screw is borne by two bearings 7, which are fixed at the two ends of the first member 1. The screw is rotatable about its longitudinal axis but not displaceable in the direction of said axis. The screw 6 through a coupling 8 at one outer end of the power unit is connected to a motor 9, preferably a hydraulic one, which is operable to set the screw in rotation. The coupling is of such type, that, in order to prevent damages of the power unit, it will slip if the torque of the screw 6 gets too high. A nut 10 is in engagement with the thread of the screw 6 and is, on the rotation of the screw, moved forwards and backwards along the screw. In doing so, the nut 10 is prevented from rotation by having opposite sides of the nut firmly connected to a connecting plate 11, which in turn is connected to a portion of the third member. The rotation of the screw 6 and the displacement of the nut accordingly result in a similar displacement of the third member. Referring to FIG. 2 as well as FIG. 3 the third member has two frames 12, which are located on either side of the symmetry plane S—S. A rotatable chain wheel 13 is fixedly disposed on each frame 12 at the two opposiste ends thereof, in such manner that a pin bolt 14 of the chain wheels has a geometrical center axis of which is parallel to the and is secured to the frame. Each of the two wheel pairs carries a chain loop 15, which during the rotation of the wheels 13 moves generally parallel to the displacement direction of the third member (arrow I). The loop 15 can also consist of a band, a belt or other flexible tractive force transmitting member. Thus, this chain loop 15 engages with teeth of the chain wheels 13. The chain wheels, as indicated in the drawings, have peripherical grooves, in which the chains are received and guided against lateral movement. Each chain loop has an inner 16 and an outer 17 chain part. The chain loop is firmly connected by a first connecting member 18 at a first point 19 to the first member and connected by a second connecting member 20 at a second point 21 to the second member (see especially FIG. 3). On displacing the third member with respect to the first member the distance L, the second member will accordingly be displaced the distance 2 L with respect to the first member (see also FIG. 5).

Figure 3:
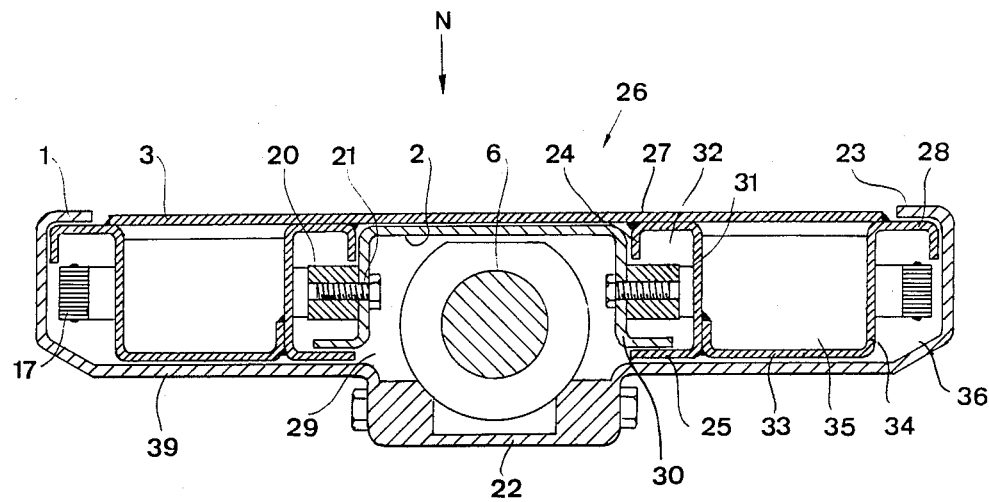
FIG. 3 is a detailed cross section view of said power unit along III—III, illustrating the mutual holding and guiding of the different members.

By referring to FIG. 3 the advantageous constitution and disposition of the three main members of the power unit in accordance with the preferred embodiment will be explained. The first member has an elongated cross-sectional shape and generally forms a housing for the power unit. The center region 22 of this housing encases the power device with the geometrical center axis of the screw 6 extending in the symmetry plane S—S of the power unit. The first member has curved support flanges 23 which extending to hold the third member. The surfaces of the curved portions support the third member for displacement within the first member. Similarly, the third member is provided with portions 24, 25, 27 having surfaces for displaceably supporting and guiding the second member. The housing formed by the first member is provided with an opening 26 extending outwardly between the curved portions 23 in the direction opposite the direction shown by arrow N. The opening is closed by an elongated top portion 27 of the third member. This portion 27 and the support portions 25 of the third member hold the second member against displacement in the latter direction. At the same time, the upper flange portion 24 of the third member is holding the second member against displacement in the direction normal to the symmetry plane S—S. Through the curved portion 23 of the first member and the curved portion 28 of the third member, the third member is held against displacement in the direction normal to the symmetry plane S—S as well as in the direction opposite the N-direction. At the same time, the third member is by this very advantageous design of the invention held indirectly by itself. The third member holds the second member, which in turn together with the first member holds portions 25 of the third member.

This design of the different members lead to their joint defining of a number of rooms. With the symmetry plane S—S as starting-point the power unit is provided with the following rooms in the direction of the normal of this plane: The central region 22 of the first member and the second member form a room 29 elongated in the displacement direction of draw I and generally housing the power device. The portion 30 of the second member and the portion 31 of the third member define a room 32 elongated in the same direction and housing the inner chain part 16 of the chain loop 15. As shown in FIG. 3, the connecting member 20 connects the inner chain part 16 to the second member. The connecting member is also situated in this room 32. The portions 27, 31, 33 and 34 of the third member forms a room 35 extending between the two chain wheels 13 and generally constituting an empty space. Finally, the portions 28 and 34 of the third member and the curved portion 23 of the first member encase a room 36 elongated also in a direction of the arrow I, through which passes the outer chain part 17 of the chain loop 15.

Figure 4:
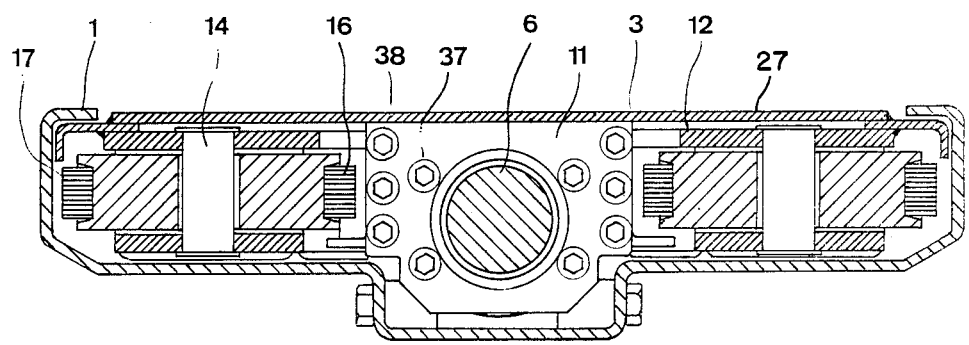
FIG. 4 is a detailed cross section view of the power unit along the cut IV—IV illustrating among other things the location of the chain transmission.

FIG. 4 illustrates that the first member and the portion 27 of the third member, form one room at the cross section IV—IV; this arrangement permits the alignment of the two chain wheels 13 with the center axis of the pin bolt 14 parallel to the direction of arrow "N". The pin bolt 14 is secured to the frames 12. The connecting plate 11 is fixed by a bolt 37 to the nut 10 and by bolts 38 to portions of the third member (see also FIG. 1 and FIG. 2).

Figure 5:
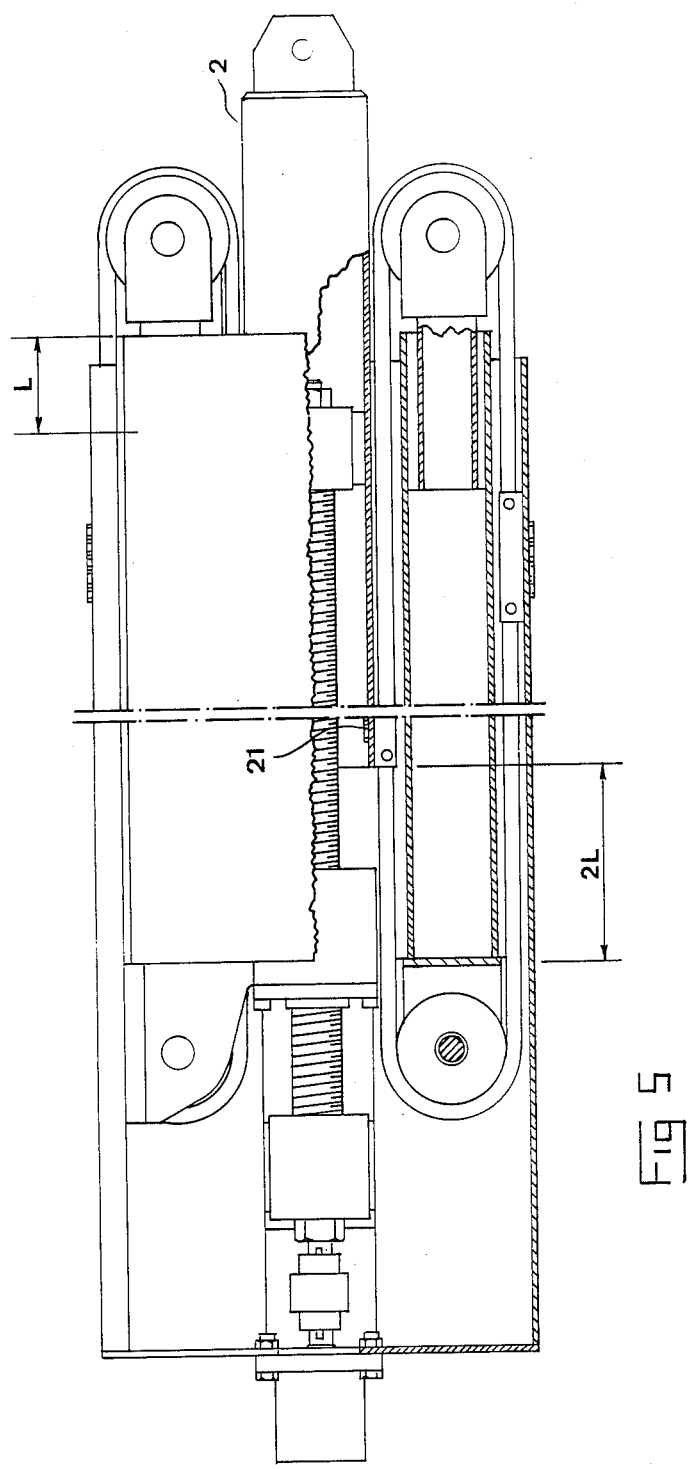
FIG. 5 is a view of the same sort as FIG. 2, but of the power unit in a more extended state dashed lines are used to indicate removal of a portion of the unit in order to compress the drawing.

Hereunder the function and the advantages of the invention according to the preferred embodiment are described. FIG. 5 illustrates the power unit in its almost completely contracted state (FIG. 2) is displaceable in the direction of the arrow I. The third member, to which the chain wheels 13 are attached, has been displaced a distance L with respect to the stationary first member. In doing so, a part of the opening 26 has been exposed, and the internal members of the power unit, e.g. the power device, have become visible. The connecting member 20 between the inner chain part 16 and the second member has at, the same time, been displaced the distance L with respect to the third member. As a result of this, the point 21, on the second member, has been displaced a distance 2 L with respect to the first member.

The power unit can be fixed on a bearer, such as a lorry chassis or platform, so that it is situated in a recess or a groove in the bearer, with the portion 27 of the third member extending beneath unrecessed parts of the bearer. Over the power unit, a lifting device, for example of the hydraulic fluid type, can be disposed so as to act between the two members, e.g. two plates, of a transmitting device. The lower plate of the transmitting device is attached to the second member 2 by the attachment mount 5. The attachment mount rests upon portions of said groove in the bearer. The two members of the transmitting device are vertically displaceable with respect to each other by the hydraulic lifting device. When the lorry is loaded and driven close to a railway car for further transport of the load, the upper member of the transmitted device is raised by the lifting device in relation to the lower member vertically upwards until the load rests solely upon this member. It should be added that it is of advantage to dispose a plurality of power units and transmitting device in grooves in the bearer parallel to each other, in order to make the carrying and transmitting of the load in a stable and safe manner. When the load is resting upon the upper member of the transmitting device the screw 6 is rotated by starting of the hydraulic motor 9. This causes the nut 10 to push the third member in the direction of the arrow "I", simultaneously, as the chain displaces the second member in the same direction and the same distance with respect to the third member (see FIG. 5). The load is now resting upon the upper member of the transmitting device indirectly connected through the lower member to the second member, and displaced so far into the railway car as required. By conversion of the number of rotation of the screw 6 caused by the hydraulic motor 9, the distance which the load is moved can be measured easily, instantaneously and exactly during the operating process. As is already known, pressure cylinders may be employed as power devices, which prevents an accurate length measurement. The railway car is preferably provided with transverse beams between which are located vacant spaces, into which vacant spaces the power unit and the lower member of the transmitting device can run and into which the upper part of the transmitting device can be lowered by way of the lifting device in order to lay the load down in the railway car. After this, the screw is rotated in the direction opposite to the previously mentioned one, and the power unit is withdrawn into to its starting position.

The power unit is partially exposed during the transfer of the load (see FIG. 5), since the opening 26 in the first member is no longer closed by the portion 27 of the displaced third member. This is advantageous for gaining access to certain members inside the power unit. If one wishes to protect the internal members of the power unit by covering the opening 26 all the time, an appropriate adaption of the first member can be made.

Since there are two chain transmissions and they are located in the way described above, important advantages in comparison with the already known constructions are obtained. The pin bolt 14 of the chain wheels has been located with its geometrical center axis parallel to the direction of the arrow "N" with the chain transmissions disposed on both sides of the power device. Thus, it was possible to make the power unit very thin in that direction. As a result, the housing of the power unit requires much less clearance in the vertical direction (the N-direction), which is very advantageous. The disposition of the chain transmissions according to above importantly result in the torsion loads upon the frame 12 of the third member bearing the chain wheels 13 being considerably lower than that for already known constructions. The fact that two instead of one chain transmission are used, reduces the laods, but most importantly is the locating of the chain transmissions symmetrically with respect to the S—S plane and generally along a plane normal to the S—S plane.

The disposition to the members for displaceably supporting by means of each other can be performed in other manners than that here described, but it must be pointed out that the illustrated disposition is very appropriately constructed. The different members are held in a stable position with the internal members of the unit protected by the first member constituting the housing and the different members can be mutually displaced in the direction of the arrow I, completely rectilinearly by forming support for each other in all directions.

Through the embodiment of the invention described above the object of the invention is obtained in a satisfactory manner. But the invention is not limited to this embodiment, but several modifications of the invention are possible. For instance it is possible to use other power devices than the screw-nut-type, such as a piston-cylinder mechanism.

I claim:

1. A power unit for reciprocally transferring an article between a pair of load members;

an elongated housing mounted to one of said pair of load members, said housing having a pair of side walls and a base defining a center region, said housing having a rectangular cross section having a predetermined width greater than a predetermined height, said housing having a longitudinal axis normal to both said height and width;

a second member extensibly mounted within said center region of said housing, said second member reciprocally extensible from said center region of said housing to an other of said pair of load members in a direction extending along said longitudinal axis of said housing;

a third member extensibly mounted in said center region of said housing, said third member having a frame;

means for displacing said third member relative to said housing, said means for displacing is mounted within said housing on a plane extending through said longitudinal axis of said housing, said plane extending in the direction of said height of the housing and defining a plane of symmetry, two pairs of wheels rotatably mounted to said frame of said third member, each wheel having an axis of rotation parallel to said symmetry plane, one pair of said two pair of wheels mounted on either side of said symmetry plane such that said two pair of wheels form a mirror image about said symmetry plane, two flexible transmission loops, each of said two loops being supported on a respective pair of said two pair of wheels, each loop having a first connection to said housing and a second connection to said second member such that said second member is displaced a predetermined first distance relative to said third member when said third member is displaced a second predetermined distance relative to said housing by said means for displacing, said second member is displaced a third predetermined distance relative to said housing equal to a sum of said first predetermined distance and said second predetermined distance; said pair of loops with said respective pairs of wheels lie in a second plane normal to said symmetry plane.

2. The power unit as defined in claim 1 comprising a first room defined by said base of said housing and said second member, said room extending along said longitudinal axis and symmetrical about said symmetry plane.

3. The power unit as defined in claim 1 wherein said means for displacing comprises an elongated screw extending in the direction of said longitudinal axis of said housing, said screw having a threaded portion.

4. The power unit as defined in claim 3 further comprising a nut threadably connected to said screw for axial movement in response to rotation of said screw, said nut being fixedly mounted to said third member.

5. The power unit as defined in claim 3 wherein said screw further comprises a center axis extending parallel to said second plane extending through said pair of loops.

6. The power unit as defined in claim 1 wherein said housing further comprises a pair of support flanges, each of said support flanges extending inwardly from one of said pair of side walls parallel and spaced apart from said base; said pair of support flanges define an opening and said third member further having a top portion which extends across said opening and under said pair of flanges such that said third member is prevented from displacement along said symmetry plane.

7. The power unit according to claim 2, wherein said third member has a pair of support portions extending toward said symmetry plane and perpendicular to said symmetry plane, said pair of support portions are disposed between said second member and said base of said housing.

8. The power unit as claimed in claim 2, wherein said second member has a U-shaped cross section, an interior surface of said U-shaped cross section of said second member and said base of said housing defining said first room containing said means for displacing, said base and said pair of side walls of said housing with an exterior surface of said U-shaped cross section of said second member defining a pair of second rooms containing said third member.

9. The power unit as described in claim 6, wherein said top portion extends over said second member to prevent said second member from displacement along said symmetry plane away from said base.

10. The power unit as claimed in claim 9 wherein said third member is positioned within said central region by said support flanges, said pair of side walls, and said base of said housing; said third member having a pair of upper flange portions for preventing displacement of said second member along said second plane below said portion of said third member.

* * * * *